March 19, 1929.  J. BINDON  1,705,710
AUTOMOBILE ACCESSORY
Filed Sept. 12, 1927   3 Sheets-Sheet 1
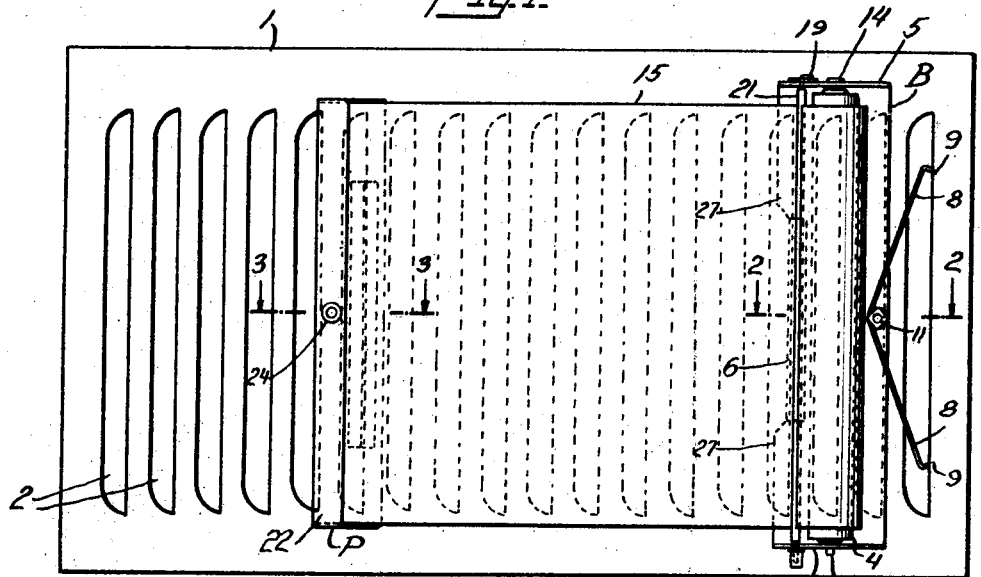
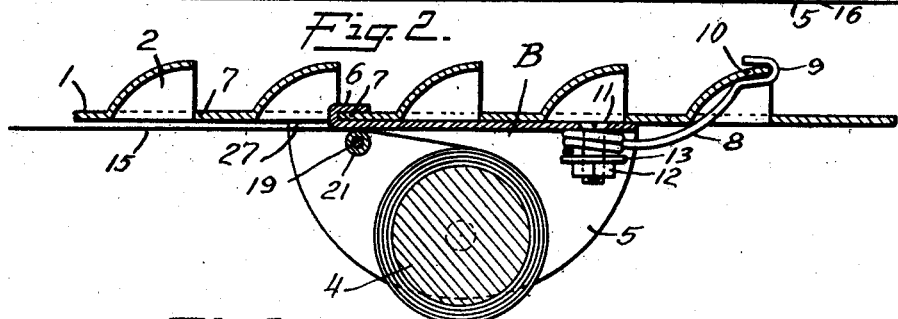
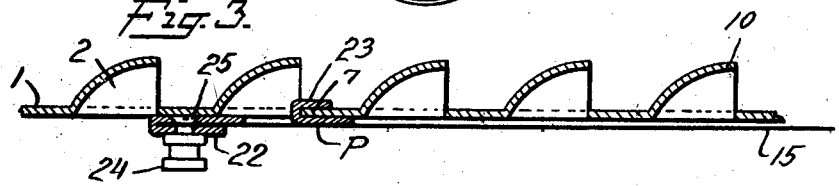
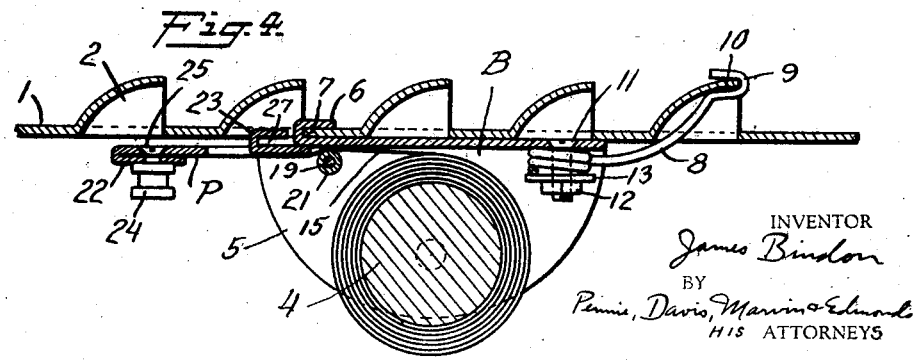
INVENTOR
James Bindon
BY
Pennie, Davis, Marvin & Edmonds
HIS ATTORNEYS

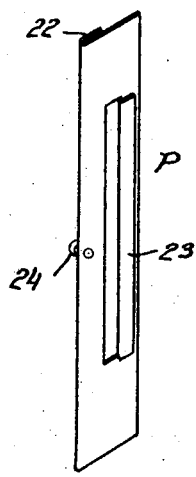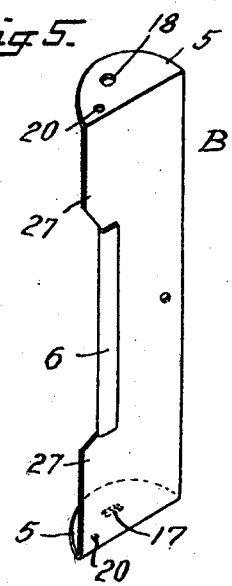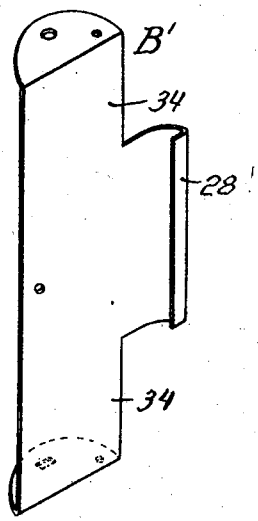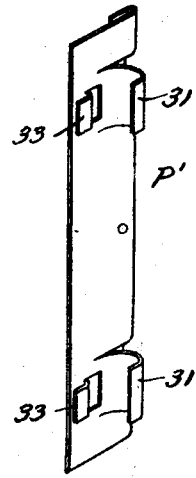

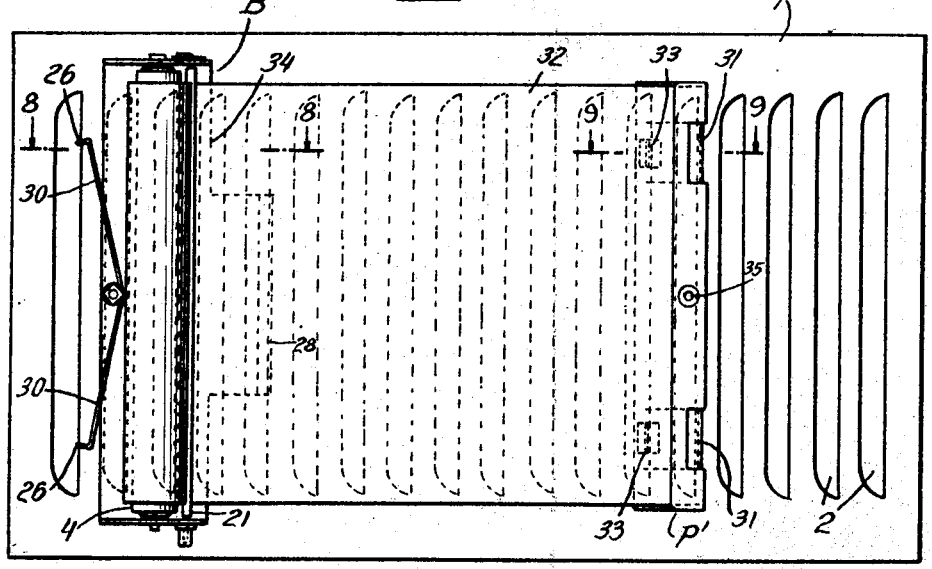
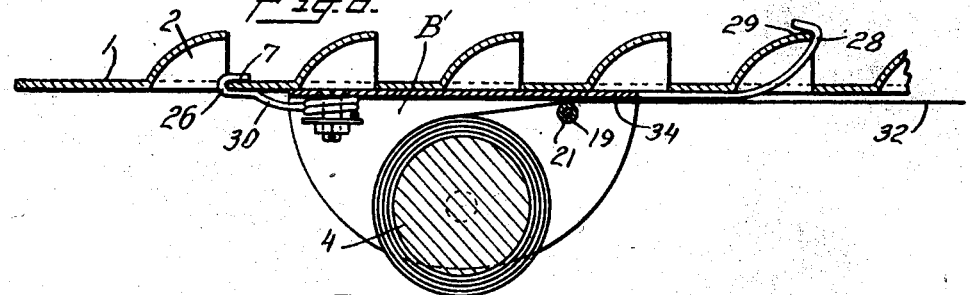
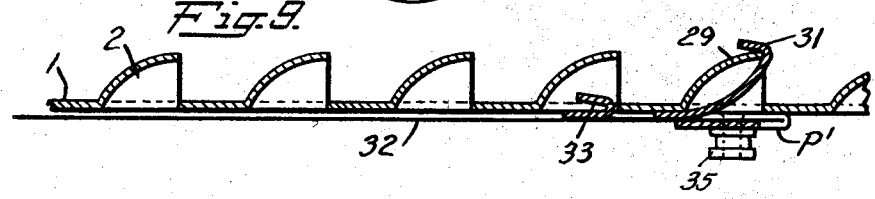
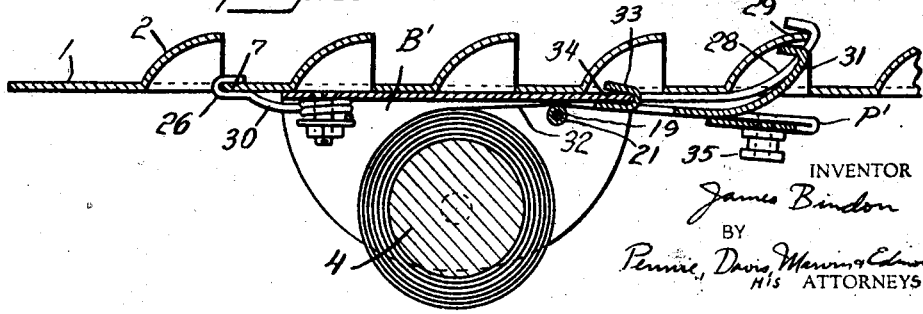

Patented Mar. 19, 1929.

1,705,710

UNITED STATES PATENT OFFICE.

JAMES BINDON, OF NEWPORT, RHODE ISLAND.

AUTOMOBILE ACCESSORY.

Application filed September 12, 1927. Serial No. 219,000.

This invention relates to automobile hood curtains. More particularly it relates to curtains for regulating the degree of ventilation and passage of air through the side vents or louvres of automobile hoods.

In automobiles employing water cooled engines a considerable inrush of air through the radiator is necessary to keep the temperatures of the motor below certain operating limits. The steady stream of inflowing air is produced in part by the forward movement of the vehicle and in part by a suction fan usually placed directly in back of the radiator.
Such air must find an outlet after being drawn through the radiator and over the engine surfaces. For that reason vents or louvres are placed in the side walls of the hood. The cold air, drawn in through the radiator, is warmed in passing through, further heated in passing over the hot engine surfaces, and drawn off partly through the louvres and partly through the opening at the rear end of the engine crank case. In warm weather it is decidedly advantageous to remove the heated air as quickly as possible from the vicinity of the engine. In cold weather, however, the exact opposite is true. When the automobile is operated, air must still be drawn in through the radiator to cool the circulating water, but the engine must not be cooled down too far by the removal of its radiated heat. It is therefore advisable to adopt some means whereby some of the radiated engine heat will be retained within the hood and not entirely drawn off by the current of air. In addition, any means for retaining the engine heat within the hood when the car is stopped in cold weather is a decided advantage. Cross drafts through the hood vents carry away the radiated heat of the motor. Snow or rain driven into the hood through the rearwardly open vents chills the motor and sometimes damages the engine.

I have, therefore, constructed a type of vent regulator which is well adapted for the purposes above mentioned and yet is extremely simple in both operation and construction. Since the fewer the obstructions to air passage in warm weather the better, I have made my device detachable; and in making it detachable I have used several features not found in any other type of vent regulator. For cold weather driving it is easily applied; for warm weather driving it is just as easily removed; and for driving in any weather at all, it provides a definite and variable adjustment of the degree of air passage through the hood vents.

In order that either the front or the rear louvres may be left uncovered to provide for the escape of some of the air either before it has passed over the engine or afterwards, I have so constructed the different embodiments of my hood curtain that the roller supports thereof may be attached either at the front or the rear end of the hood section, and the curtain unrolled to cover either the rear or the front louvres as desired. In addition, I have devised a hood curtain adaptable to louvres of different lengths, so that my device may be applicable to the hood sections of substantially all types of automobiles.

Various other specific objects, advantages and characteristic features of my invention will become apparent as the description thereof progresses.

In describing the invention in detail, reference will be made to the accompanying drawings, in which:

Fig. 1 is a side view of the interior surface of an automobile hood wall, showing the hood curtain of the present invention secured to cover a portion thereof;

Fig. 2 is a sectional view taken along the line 2—2 of Fig. 1, and viewed in the direction of the arrows;

Fig. 3 is a sectional view taken along the line 3—3 of Fig. 1;

Fig. 4 is a sectional view similar to Fig. 2, showing the hood curtain in the retracted position;

Fig. 5 is a perspective view of the roller support or bracket of the embodiment of the invention shown in Fig. 1;

Fig. 6 is a perspective view of the curtain end plate employed in the embodiment of Fig. 1;

Fig. 7 is a side view of an automobile hood wall showing a modified form of the curtain of the present invention;

Fig. 8 is a sectional view taken along the line 8—8 of Fig. 7;

Fig. 9 is a sectional view taken along the line 9—9 of Fig. 7;

Fig. 10 is a sectional view similar to Fig. 8, showing the hood curtain in its retracted position; and Figs. 11 and 12 are perspective views respectively of the hood curtain roller support and the curtain end plate of the modification of the invention shown in Fig. 7.

Referring first more particularly to the modification of the invention shown in Figs. 1 through 6, the hood curtain of the present invention has been shown applied to the inner surface of the side wall 1 of an automobile hood, this side wall having a plurality of outwardly extending rearwardly opening vents or louvres 2 therein. In Fig. 1, as well as in Fig. 7, the left-hand end of the hood wall 1 is assumed to be the forward end thereof. A bracket or support B is provided, and carries a curtain roller 4 between two inwardly extending shoulders 5 thereof. The bracket B is preferably formed of a suitable sheet metal, and one edge thereof is folded over to form an elongated hook-like projection 6 on the opposite side of the bracket from the shoulders 5. As clearly shown in Figs. 2 and 4, the projection 6 is adapted to fit over and closely engage the side wall 1 of the hood along the rearward edge 7 of one of the vents or louvres 2. The projection 6 is centrally disposed with respect to the bracket B and is arranged to be considerably shorter than the shortest hood vents or louvres employed on automobiles, so that the bracket B may be readily attached to hoods having louvres of various designs. A pair of spring arms 8, preferably comprising a single piece of spring steel wire, are secured to the bracket B near the edge thereof at a point opposite the center of the projection 6. These arms are bent outwardly as shown in Figs. 2 and 4, and are provided with hooks 9 on their outer ends for engagement with the trailing outer edges 10 of the louvres 2. The spring arms 8 are secured to the brackets B in any suitable manner, and in the embodiments shown, are bent around the shank of a bolt 11, the head of which is countersunk into the bracket B, the spring being held in place by a nut 12 and a washer 13.

From the description given, it will be readily apparent that the bracket B may be quickly and easily secured to the wall 1 of an automobile hood by passing the hooklike projection 6 over the rear edge 7 of a vent or louvre, and by snapping the hooked ends 9 of the spring arms 8 over the trailing edge of another louvre. In this manner, the bracket is securely but releasably fastened to the hood wall in a position from which the curtain may be drawn forward to cover the louvres 2.

The curtain roller 4 may be of any suitable construction, but is preferably of the type provided with an internal coiled spring which is arranged to apply a torque on a fixed hub 14 tending to turn the roller 4 in a clockwise direction, as viewed in Figs. 2 and 4. No catches or ratchets are provided in connection with the roller, and a tension is therefore continuously applied to the curtain. The fixed hub 14 and the journaled hub 16 of the roller 4 are supported respectively in the slot 17 and the circular opening 18 in the opposite shoulders 5 of the bracket B.

The curtain 15 passes under a rod 19 secured in aligned openings 20 in the shoulders 5, this rod being provided with a tubular roller 21, and in this manner the curtain is maintained in a position close to the inner surface of the hood wall 1. An end plate P is secured to the free end of the curtain 15 in any suitable manner, the curtain being preferably pinched between the inner face of the plate and the reversely bent end 22 thereof, as shown in Figs. 3 and 4. An elongated hook-like projection 23 is cut or stamped from the plate P and is bent to form a rearwardly presented hook which may be passed over the rearward edge 7 of a louvre 2, as shown in Fig. 3. The projection 23 is arranged to be considerably longer than the corresponding projection 6 of the bracket B, for a purpose which is hereinafter described. An inwardly projecting knob or stop 24 is secured to the plate P by the bolt 25, the head of this bolt being countersunk in the plate so that the plate may lie snugly against the hood wall 1.

When it is desired to extend the curtain 15 over the louvres 2, the end plate P is drawn forward by the knob 24, and the projection 23 is hooked over the edge 7 of one of the louvres. The curtain may be extended to any desired point, and in this manner, the amount of air passing through the hood wall may be regulated in accordance with conditions of weather and temperature. The tension applied to the curtain 15 by the spring operated roller 4 maintains the plate P in place, and holds the curtain in close contact with the hood wall 1. The roller 21 carried on the rod 19 holds the rearward end of the curtain close to the hood wall, as clearly shown in Fig. 2.

When it is desired to roll up the curtain and so uncover the louvres 2, the plate P is drawn forward and the projection 23 is unhooked from the edge 7 of the louvre, whereupon the spring operated roller 4 rolls the curtain up. Since no catches or ratchets are provided in connection with the roller 4, means must be included to prevent the curtain from passing between this roller and the bracket B and thereby permitting the spring in the roller to run down. In the present embodiment, this is accomplished by means of the projection 23 on the end plate P, which projection, as described above, is longer than the projection 6 on the bracket B, and therefore extends beyond the ends of the projection 6 and engages the forward edge 27 of the bracket, as shown in Fig. 4. In this manner, the end plate P is securely fastened to the bracket B when the curtain 15 is retracted. If the projection 23 on the end plate P should fail to catch the edge 27 of the bracket B, the knob 24 on the plate comes into contact with the roller 21 on the rod 19, thereby preventing the release of the curtain and the running down of the spring in the roller 4.

In the embodiment of the invention shown in Figs. 7 through 12, a slightly modified form of bracket and curtain end plate are shown, these parts being adapted to be attached to the side wall 1 of an automobile hood in such a manner that the curtain is drawn from the front end of the hood toward the rear end thereof. The bracket B' of this modification has a plate or extension 28 on its rearwardly disposed edge, this extension being formed and adapted to pass through one of the louvres 2 and to engage the trailing edge 29 thereof, as clearly shown in Fig. 8. A pair of spring arms 30 having hooked ends 26, similar to the spring arms 8 of the modification of Fig. 1, are suitably secured to the forward edge of the bracket B', and are arranged to be passed over the hood wall 1 at the rearward edge 7 of one of the louvres 2, and the bracket B' is securely and releasably attached to the hood wall between these spring arms and the hook-like extension 28.

The curtain end plate P' of the modification of Figs. 7 through 12 is provided with a pair of spaced hooks or projections 31 which are arranged to pass through one of the vents 2 and to engage the outer trailing edge 29 thereof, as shown in Fig. 9, thereby adjustably securing the curtain 32 in place in a manner similar to that described in connection with the modification of Figs. 1 through 6. The hooks 31 are spaced apart a greater distance than the width of the extension 28 on the bracket B', so that when the curtain 32 is retracted, these hooks 31 lie within the cavity of the louvre 2 which is engaged by the extension 28. Two small hooks 33 are preferably stamped from the plate P' adjacent the hooks 31, and are designed to engage the edge 34 of the bracket B' on either side of the projection 28 when the curtain is retracted, as shown in Fig. 10. In this manner, the plate P' is securely and releasably attached to the bracket B' when the curtain 32 is not in use. A knob 35, similar to the knob 24 in the modification of Figs. 1 to 12, is secured to the plate P', acting as a convenient handle for manipulating the end plate.

From the description given, it will be seen that the hood curtain of the present invention has many advantageous features. The hook-like extensions on the brackets B and B' and on the curtain end plates P and P' act as reinforcing members and add greatly to the strength and stiffness of these parts. These extensions also retain the brackets and plates in snug contact with the hood walls, and prevent the rattling of these parts due to the vibration of the automobile. The hook-like connection between the curtain end plates and the brackets when the curtain is retracted securely connects these parts and conveniently supports the end plate when the curtain is not in use.

By proper adjustment of the end plates, the curtains may be arranged to cover any desired number of louvres or vents, and in this manner, any required degree of air circulation through the hood walls may be secured. In this connection, it should be noted that the curtain end plates P and P' are designed to cover the particular vent or louvre to which they are secured, and for this reason the curtain may be extended to cover all of the vents up to one end of the hood wall.

Although the present invention has been described in connection with certain specific embodiments, it should be understood that various changes, modifications, additions or omissions may be made to the embodiments disclosed without departing from the scope of the invention as defined in the appended claims.

I claim:

1. In a cover device for automobile hood walls having a plurality of vents intermediate the ends thereof, a bracket, a curtain roller carried by said bracket, a curtain carried by said roller and adapted to selectively cover said vents to provide a variable degree of ventilation, a hook formed integral with said bracket at one edge thereof for engaging the edge of one of said vents in the hood wall, and spring means secured to said bracket near the other edge thereof for engaging the edge of another of said vents, whereby said bracket may be releasably secured to said hood wall.

2. In a cover device for automobile hood walls having a plurality of vents intermediate the ends thereof, a bracket having a flat base portion and a pair of projecting shoulder portions, a roller carried by said shoulders, an extensible curtain carried by said roller, a hook-like projection formed integral with said base portion and adapted to engage the hood wall at the edge of one of said vents, and a pair of spring arms secured to said base portion near the other edge thereof and adapted to engage the hood wall at the edge of another of said vents, said spring arms holding said projection in engagement with said hood wall.

3. In a cover device for automobile hood walls having a plurality of vents therein, a support, a roller mounted on said support, an extensible and retractable curtain secured to said roller and adapted to cover at least some of the vents in a hood wall, and means for removably securing said support to the hood wall comprising an integral hook-like projection extending along one edge of said support for engaging the hood wall at the edge of one of said vents, and resilient means at the opposite edge of said support for engaging said hood wall and retaining said integral projection in position, whereby said support is removably secured to said hood wall.

4. In a cover device for an automobile hood wall having a plurality of spaced parallel vents therein, a sheet metal bracket including a base portion having an integral hook-shaped extension along one edge thereof, said extension being adapted to engage a hood wall at the edge of a vent in the wall, spring means secured to the opposite edge of the base portion of said bracket for releasably engaging the hood wall at another of the vents and for securely fastening said bracket to said wall against the counteraction of said extension, a spring roller carried by said bracket, and an extensible and retractable curtain mounted on said roller.

5. In a device of the character described, means for attaching the end of an extensible and retractable curtain to the interior of an automobile hood wall having a plurality of vents therein, comprising an end plate secured to the end of said curtain, and an integral hook on said plate spaced from the free end thereof and adapted to engage the edge of said hood wall at one of said vents, said plate extending over the vent at the edge of which said hook is secured.

In testimony whereof I affix my signature.

JAMES BINDON.